United States Patent
Kumar

(10) Patent No.: US 8,547,035 B2
(45) Date of Patent: *Oct. 1, 2013

(54) DIMMER ADAPTABLE TO EITHER TWO OR THREE ACTIVE WIRES

(75) Inventor: Russikesh Kumar, Jersey City, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 290 days.

This patent is subject to a terminal disclaimer.

(21) Appl. No.: 13/088,084

(22) Filed: Apr. 15, 2011

(65) Prior Publication Data

US 2011/0193490 A1     Aug. 11, 2011

Related U.S. Application Data

(63) Continuation-in-part of application No. 12/503,391, filed on Jul. 15, 2009, now Pat. No. 7,928,663.

(51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |
| *H05B 41/24* | (2006.01) |
| *H05B 41/16* | (2006.01) |

(52) U.S. Cl.
USPC ........... 315/291; 315/272; 315/246; 323/237; 323/246; 323/282

(58) Field of Classification Search
USPC .......................... 315/291, 171, 200; 323/285
See application file for complete search history.

(56) References Cited

U.S. PATENT DOCUMENTS

| | | | |
|---|---|---|---|
| 4,529,951 | A | 7/1985 | Youichi et al. |
| 4,716,357 | A | 12/1987 | Cooper |
| 4,728,866 | A | 3/1988 | Capewell |
| 4,876,498 | A | 10/1989 | Luchaco |
| 4,888,494 | A | 12/1989 | McNair et al. |
| 4,954,768 | A | 9/1990 | Luchaco et al. |
| 5,191,265 | A | 3/1993 | D'Aleo |
| 5,260,669 | A | 11/1993 | Higgins et al. |

(Continued)

OTHER PUBLICATIONS

Ki, Phase-Controlled Dimmable Electronic Ballast for Flourescent Lamps, Power Electronics Specialists Conference 1999, 30th Annual IEEE, pp. 1121-1125, vol. 2, IEEE.

(Continued)

*Primary Examiner* — Shawki Ismail
*Assistant Examiner* — Dylan White
(74) *Attorney, Agent, or Firm* — Crestron Electronics Inc.

(57) ABSTRACT

A dimmer adaptable to either two (H, DH) or three (H, N, DH) active wires includes a first full-wave rectifier (D1, D2, D3, D4) across an AC power hot (H) terminal and a dimmer hot (DH) terminal and a second full-wave rectifier (D1, D4, D5, D6) across the AC power hot (H) terminal and an AC power neutral (N) terminal. The dimmer operates in a two-wire configuration by drawing power through a load when a control circuit is not conducting or in a three-wire configuration, when the AC power neutral (N) terminal is connected, by drawing power from AC power hot (H) and AC power neutral (N) terminals. The dimmer operates according to a first set of preset dim levels when current is flowing through the first rectifier and according to a second set of preset dim levels when current is flowing through the second rectifier.

16 Claims, 14 Drawing Sheets

(56) References Cited

U.S. PATENT DOCUMENTS

| | | |
|---|---|---|
| 5,289,043 A | 2/1994 | Marshall et al. |
| 5,293,308 A | 3/1994 | Boys et al. |
| 5,399,926 A | 3/1995 | Adams et al. |
| 5,430,356 A | 7/1995 | Ference |
| 5,463,286 A | 10/1995 | D'Aleo et al. |
| 5,488,307 A | 1/1996 | Plott |
| 5,670,858 A | 9/1997 | Heath |
| 5,777,837 A | 7/1998 | Eckel |
| 5,798,581 A | 8/1998 | Keagy |
| 5,804,991 A | 9/1998 | Hu |
| 5,903,139 A | 5/1999 | Kompelien |
| 5,905,442 A | 5/1999 | Mosebrook |
| 5,949,200 A | 9/1999 | Ference |
| 5,982,103 A | 11/1999 | Mosebrook |
| 6,091,205 A | 7/2000 | Newman, Jr. et al. |
| 6,218,787 B1 | 4/2001 | Murcko et al. |
| 6,262,565 B1 | 7/2001 | Williams |
| 6,356,038 B2 | 3/2002 | Bishel |
| 6,374,028 B2 | 4/2002 | Yamada |
| 6,750,564 B2 | 6/2004 | Cencur |
| 6,969,959 B2 | 11/2005 | Black et al. |
| 7,218,063 B2 * | 5/2007 | Konopka et al. ............... 315/291 |
| 7,342,764 B2 | 3/2008 | Black |
| 7,480,128 B2 | 1/2009 | Black |
| 7,609,007 B1 * | 10/2009 | Kumar ........................... 315/246 |
| 7,928,663 B1 * | 4/2011 | Kumar ........................... 315/246 |
| 2005/0275354 A1 | 12/2005 | Hausman et al. |
| 2005/0289184 A1 * | 12/2005 | Dettinger et al. .............. 707/200 |
| 2006/0109702 A1 * | 5/2006 | Weightman ................... 363/149 |
| 2006/0255745 A1 | 11/2006 | DeJonge |
| 2007/0001654 A1 | 1/2007 | Newman, Jr. |
| 2007/0285027 A1 | 12/2007 | Gehman |
| 2008/0024074 A1 | 1/2008 | Mosebrook et al. |
| 2008/0111501 A1 * | 5/2008 | Dobbins et al. ............... 315/294 |
| 2009/0039854 A1 * | 2/2009 | Blakeley ........................ 323/285 |
| 2009/0108765 A1 * | 4/2009 | Weightman et al. .......... 315/224 |

OTHER PUBLICATIONS

Crestron, CNLDM-6, Schematic, 2006, Crestron Electronics, Inc., Rockleigh, NJ.

Busch, Busch Unversal Dimmer 6590U-102, Manual, Busch-Jaeger Elektro GmbH, Manheim, Germany.

* cited by examiner

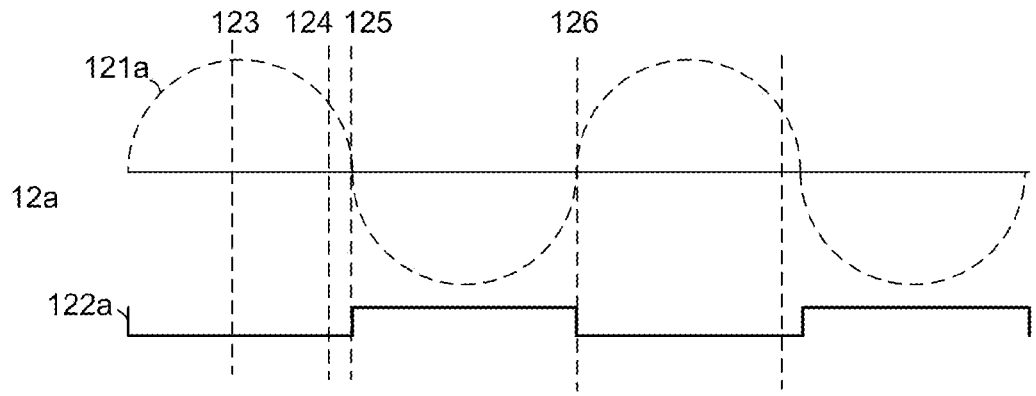
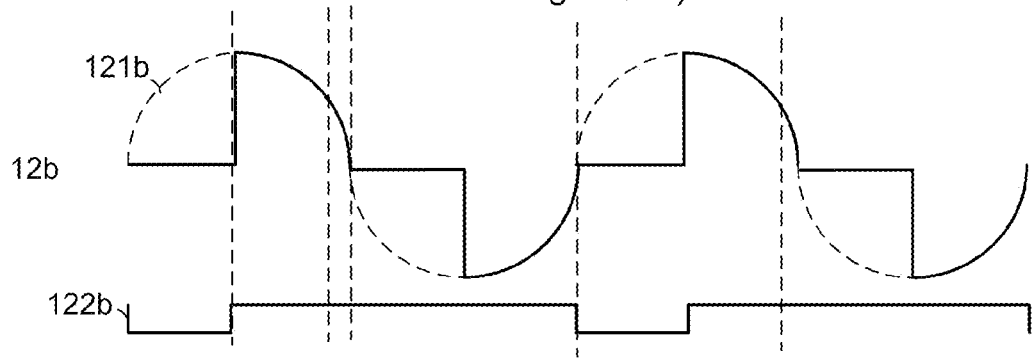
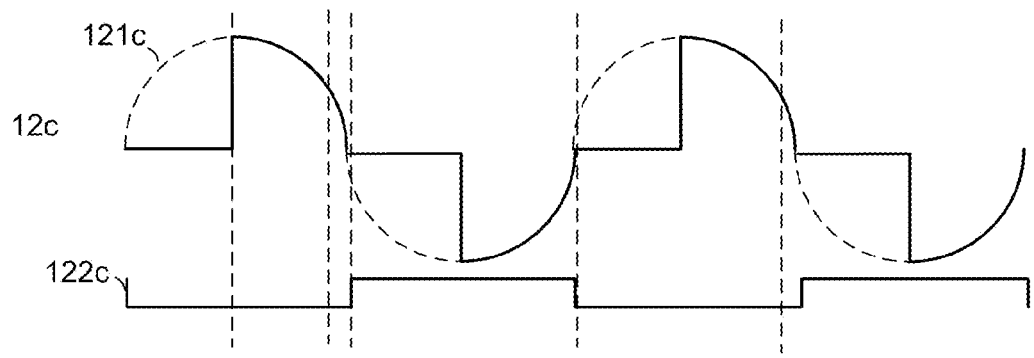
FIG. 12

DIMMER ADAPTABLE TO EITHER TWO OR THREE ACTIVE WIRES

BACKGROUND OF THE INVENTION

1. Technical Field

The present invention relates to a load control device and more specifically to a lighting dimmer that is operable when connected to either two or three active electrical wires.

2. Background Art

It is known to those skilled in the art, that standard 120 VAC residential wiring provides three conductors (e.g. wires) to which an installer can attach various equipment, such as lighting dimmers. It is also known that two of these three conductors are active current carrying conductors, meaning that connections to these active conductors are required to complete a functional circuit. The US National Electrical Code specifies, for 120 VAC residential wiring, that a first active conductor with significant voltage to earth ground be identified as a 'hot' (H) conductor and color-coded black and that a second active conductor near ground potential be identified as a 'neutral' (N) conductor and color-coded white. US National Electrical Code further specifies, for 120 VAC residential wiring, a third (passive) safety ground (G) conductor not normally used to carry circuit current and color-coded as green or as a bare uninsulated conductor.

Dimmers are devices used to vary the brightness of a lamp typically by modulating the duty cycle of the supplied AC power, such as by controlling a triac to turn on only after waiting for a period time has elapsed since a zero-crossing and allowing the triac to turn off at the next zero crossing. Although such phase control devices can be used for various purposes, the term dimmer is generally reserved for those intended to control lighting. By decreasing or increasing the AC duty cycle and hence the mean power to the lamp it is possible to vary the intensity of the light output from the lamp. Such a variable duty cycle AC voltage output is controlled by a dimmer, referenced to neutral (N), is identified as a 'dimmer hot' (DH) active conductor, and could be color-coded as blue (or red).

Lighting equipment manufacturers have developed two versions of residential lighting dimmers. A three-wire dimmer, known in the prior art, is shown in FIG. 1 and a two-wire dimmer, also known in the prior art, is shown in FIG. 2. As shown in FIG. 1, the three-wire dimmer 12 is connected such that its internal power supply is sourced directly from the hot (H) and neutral (N) line voltages of the AC voltage source 11. As shown in FIG. 2, the two-wire dimmer 22 is connected such that its internal power supply is sourced in series with the lighting load 13 to be dimmed, such as for example, an incandescent lamp. The two-wire dimmer 22 type is more prevalent in renovation work because it can be installed as a direct replacement for a wall switch without modifying the associated residential house wiring. The three-wire dimmer 12 type is typically used in new construction or where better performance is desired.

Refer now to FIG. 1. When a neutral (N) wire is present in a wall box, such as in new construction, it may be desirable to connect a three-wire dimmer 12 between the AC source 11 hot (H) and neutral (N) conductors and the lighting load 13. Such a neutral wire can be provided at the wall box by inserting a splice 14 into the circuit neutral wiring to the lighting load 13. Variable voltage, with respect to circuit neutral (N) is provided from the three-wire dimmer 12 as a dimmed hot (DH) output to the lighting load 13 hot (H) conductor. Advantageously, in this configuration a power supply, internal to the three-wire dimmer 12, will always be able to charge up through the hot (H) to neutral (N) path thus eliminating constraints on high end (maximum light output) and minimum load wattage. The neutral (N) wire connection also provides a means to obtain an accurate zero crossing signal from the AC source 11. The neutral (N) wire connection also allows for the three-wire dimmer 12 to operate as a full-on/full-off electronic switch since the output can go to full conduction. Such a full-on/full-off mode is desirable if the lighting load is replaced with a general appliance, such as an electric fan.

Refer now to FIG. 2, which shows common residential wiring practice when there no neutral (N) wire is present in the residential wall box. In this case, a two-wire dimmer 22 is serially connected between the AC source 11 hot (H) conductor and the lighting load 13 hot (H) conductor. The two-wire dimmer 22 hot (H) conductor connects to the AC power source 11 hot (H) conductor and the dimmer hot (DH) conductor from the two-wire dimmer 22 connects to the hot conductor (h) of the lighting load 13. In this two-wire configuration, the power supply within the two-wire dimmer 22 can only charge up when there is a voltage across the two-wire dimmer 22, for example, when a switching device internal to the two-wire dimmer 22, such as an internal triac, is not conducting.

The charging path for the two-wire dimmer 22 power supply is from AC Source 11 hot, through two-wire dimmer 22 exiting as dimmed hot (DH), through the lighting load 13, and then returning to AC source 11 neutral (N). Therefore, In order to charge up its internal power supply, the two-wire dimmer 22 internal switching device is required to be non-conducting for a portion of each AC half cycle. This limits the maximum lighting level of light load 13 and also limits the maximum load resistance that can be connected. Typically, connecting a lighting load 13 less than 50 watts at 120 VAC causes problems for a two-wire dimmer 22 power supply to charge up when at high end (e.g. maximum light level). This problem is exacerbated for two-wire dimmers that require additional current draw, such as those containing radio transceivers.

One of the specific problems in the field is that installers would like the choice of wiring dimmers in either the two-wire or three-wire configurations, as described above, but are desirous of only stocking one standard type dimmer to avoid the cost and complexity associated with stocking different part numbers.

In response to this problem, some manufacturers, such as Leviton Manufacturing Co., Inc., have developed a manually configurable three-wire dimmer product with a neutral (N) wire connection that can either be connected to AC source neutral (N) (for three-wire configuration) or externally connected to the lighting load along with the dimmed hot (DH) wire (for two-wire configuration). Such a configuration is illustrated in FIG. 3.

Refer now to FIG. 3. When operating in two-wire configuration, the neutral (N) wire on the manually configurable dimmer 32 needs to be connected to the lighting load 13 hot (H) wire along with the dimmed hot (DH) wire to ensure a symmetrical flow of current through the lighting load 13 when the power supply internal to the manually configurable dimmer 32, is charging. This is necessary especially for magnetic load types, such as low voltage transformers, because charging up asymmetrically can lead to heating in the transformer coil which can damage the transformer. Charging asymmetrically also limits the ability for the manually configurable dimmer 32 internal power supply to charge fully.

During installation, the manually configurable dimmer 32 can be set to operate in the above described two wire configuration by adding an external jumper 34 between the neutral (N) and dimmer hot (DH) terminals. The manually configurable dimmer 32 can alternatively be set to operate in the three-wire configuration by not including the external jumper 34 and wiring as described above for FIG. 1.

Typically, this additional external jumper 34 connection is simple to make as flying wire leads from the dimmer can be connected appropriately using twist-on wire connectors. However, it is now desirous for lighting dimmers to employ screw terminals similar to those found on standard light switches, such as a light switch being replaced by said dimmer, to make installation easier. In such an easier installation, the dimmer would be a drop-in replacement for the switch being removed and would not require bulky twist-on wire connectors to be squeezed into the residential wall box. These desired screw terminals pose a problem with making the external jumper 34 connection between the neutral (N) terminal and the dimmed hot (DH) terminal of the manually configurable dimmer 32 known in the prior art. The external jumper 34 would still be needed to configure the manually configurable dimmer 32 into a two-wire configuration as in the equivalent dimmer with flying leads but when screw terminals are introduced, this external jumper 34 jumper is likely to be ignored or misapplied by the installer resulting in faulty operation or failure of the device.

To solve the aforementioned problems associated with using a standard dimmer for both two-wire and three-wire dimming applications, the present invention is a unique simple and reliable standard dimmer adaptable to either two or three active wires.

SUMMARY OF THE INVENTION

The following summary of the invention is provided to facilitate an understanding of some of the innovative features unique to the present invention. A full appreciation of the various aspects of the invention can only be gained by taking the entire specification, claims, drawings, and abstract as a whole.

The invention is a power supply topology that operates in 3-wire configuration when a direct connection to AC line neutral is made and operates in 2-wire configuration if this connection is not made.

When used in a dimmer with screw terminals this is particularly important as it eliminates the need for a jumper wire to reconnect the neutral terminal to the lighting load In both configurations of operation, the power supply charges symmetrically in both half cycles and prevents DC current from flowing through the load.

According to a first aspect, the present invention provides a lighting dimmer adaptable to being connected to either two active wires consisting of: AC line hot (H) and dimmer hot (DH), or three active wires consisting of: AC line hot (H), AC line neutral (N), and dimmer hot (DH). The light dimmer further comprises an internal power supply, an energy storage device, a control circuit, a first full-wave rectifier, and a second full-wave rectifier. The energy storage device is associated with, and provides power to the internal power supply. The control circuit is powered by the internal power supply and switches ON and OFF a conductive path between the AC line hot (H) connection and the dimmer hot (DH) connection according to a first set of preset dim levels or a second set of preset dim levels dependent on whether the dimmer is in a two wire mode or three wire mode, respectively. The first full-wave rectifier converts the alternating current input voltage present between the AC line hot (H) connection and the dimmer hot (DH) connection into DC voltage to charge the energy storage device. This alternating current input voltage between the AC line hot connection and the dimmer hot connection is present when the control circuit is providing a nonconductive electrical path (e.g. switched OFF) between the AC line hot (H) connection and the dimmer hot (DH) connection and when an external load is connected between the dimmer hot (DH) connection and an external AC line neutral return. The second full-wave rectifier converts an alternating current input voltage present between the AC line hot (H) connection and the AC line neutral (H) connection into DC voltage to also charge the energy storage device. This alternating current input voltage between the AC line hot (H) connection and the AC line neutral (N) connection is present only when the dimmer is directly connected to both AC source (H, N) active wires.

According to a second aspect, the present invention provides a method of operating a lighting dimmer according to either a first set of preset dim levels or a second set of preset dim levels. This method comprises the step of providing a dimmer that includes a control circuit, a first full-wave rectifier and a second full-wave rectifier. The control circuit is switchably operable to provide either a conductive or nonconductive electrical path between an AC line hot connection and a dimmer hot connection of the lighting dimmer. The first full-wave rectifier is configured for rectifying an alternating current input voltage present between the AC line hot connection and the dimmer hot connection, wherein said alternating current input voltage between the AC line hot connection and dimmer hot connection is present when the control circuit is providing a nonconductive electrical path between the AC line hot connection and the dimmer hot connection and an external load is connected between the dimmer hot connection and an AC line neutral return. The second full-wave rectifier is configured for rectifying an alternating current input voltage present between the AC line hot connection and an AC line neutral connection, wherein the alternating current input voltage is present only when the dimmer is connected to three active wires. This method also comprises the steps of switchably providing a conductive or nonconductive electrical path between the AC line hot connection and the dimmer hot connection according to a first set of preset dim levels when current is flowing through the first full wave rectifier and according to a second set of preset dim levels when current is flowing through the second full wave rectifier.

The present invention seeks to overcome or at least ameliorate one or more of several problems, including but not limited to: providing a standard dimmer that can automatically adapt to either two or three active wires.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

BRIEF DESCRIPTION OF DRAWINGS

The accompanying figures further illustrate the present invention.

BRIEF DESCRIPTION OF THE SEVERAL VIEWS OF THE DRAWING

Figure 1:
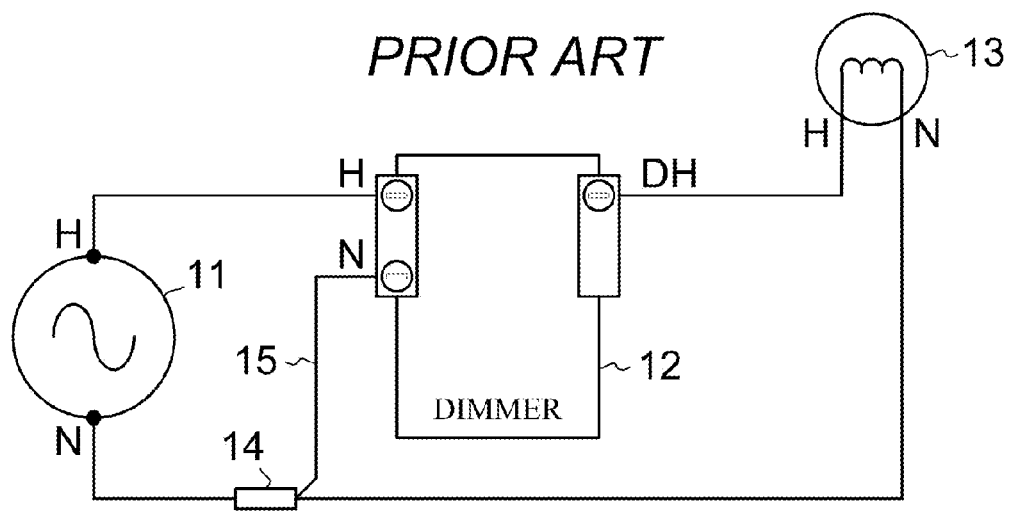

FIG. 1 depicts a wiring scheme for a three-wire dimmer that has been used in the prior art.

Figure 2:
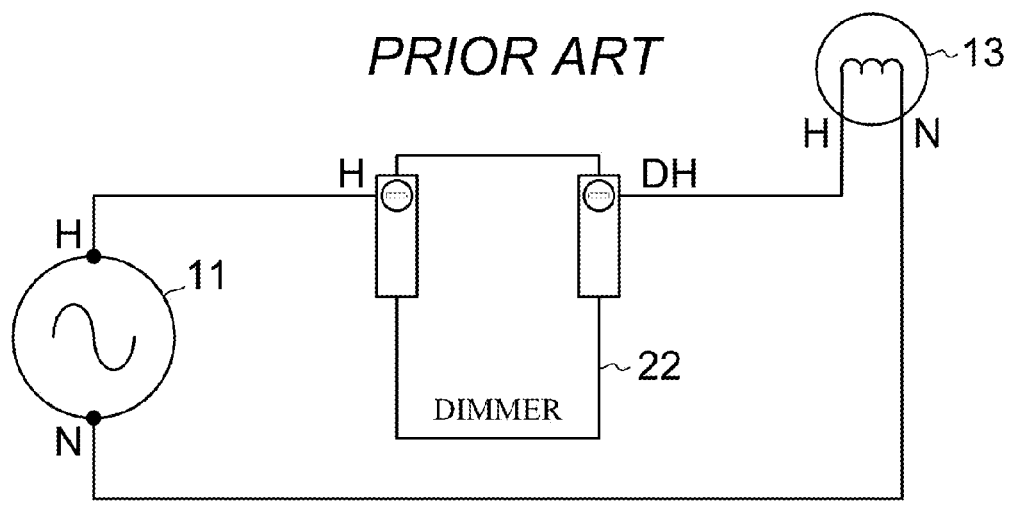

FIG. 2 depicts a wiring scheme for a three-wire dimmer that has been used in the prior art.

Figure 3:
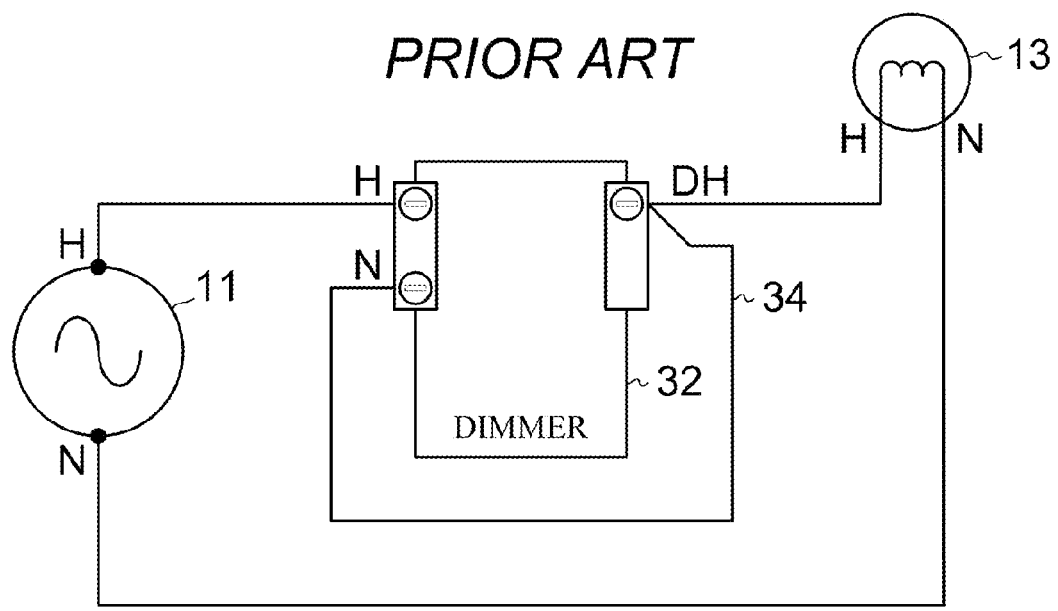

FIG. 3 shows an attempt in the prior art to use a single type dimmer for both two and three wire configurations, where the single type dimmer is shown configured manually for two-wire operation.

Figure 4:
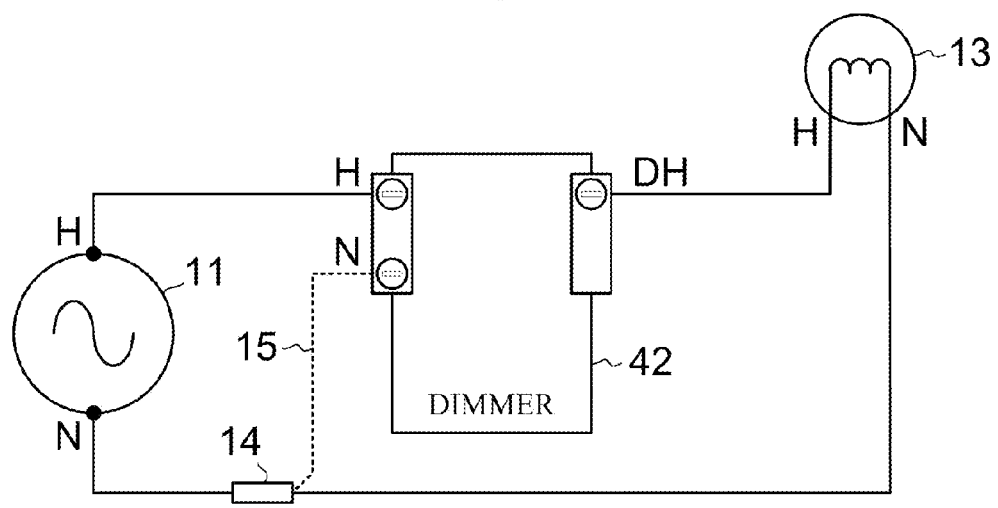

FIG. 4 shows a single type dimmer wired for two-wire operation in accordance with one illustrative embodiment of my invention.

Figure 5:
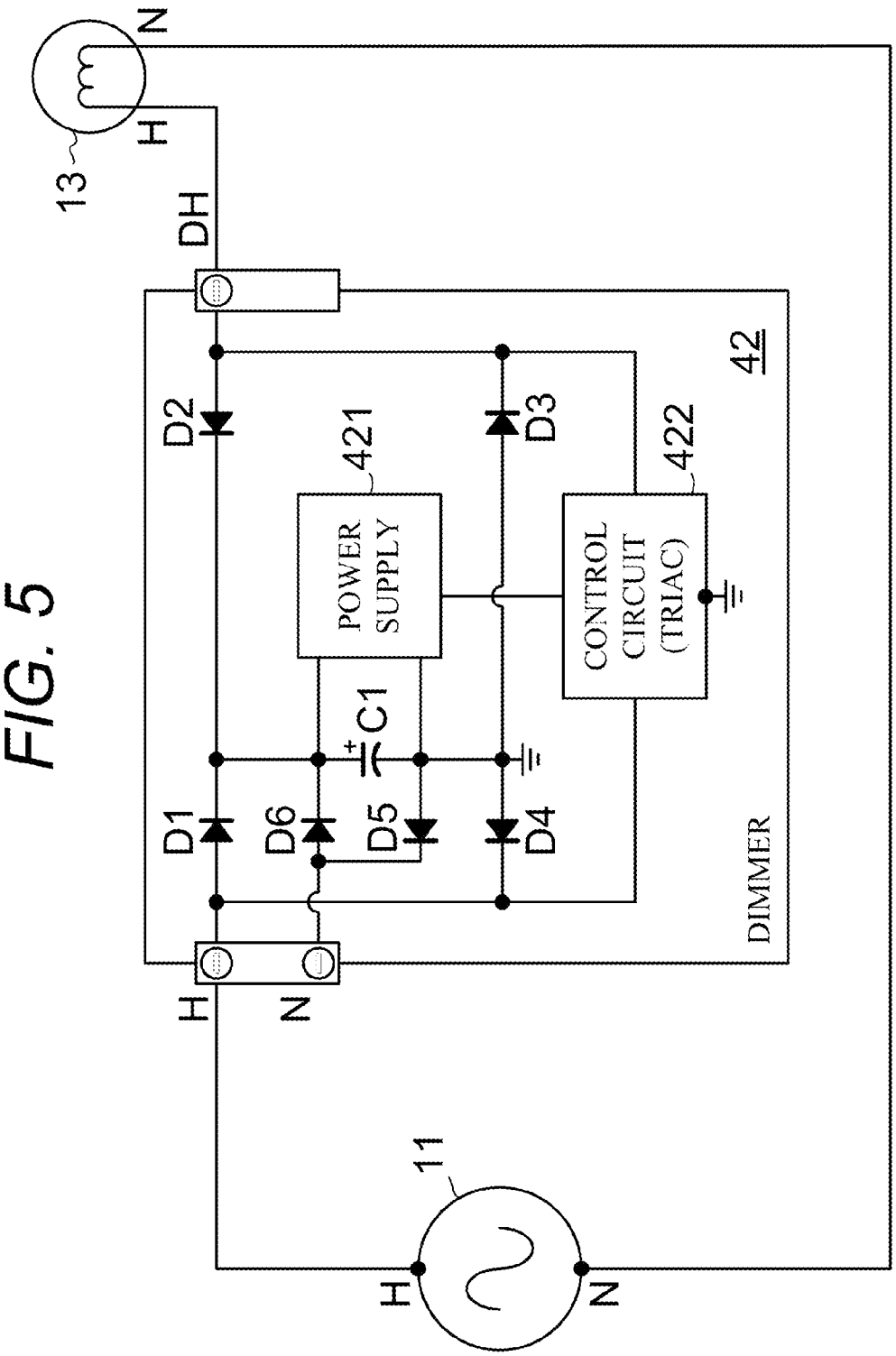

FIG. 5 further details the operation of my inventive dimmer while it is operating in a two-wire configuration in accordance with an illustrative embodiment of my invention.

Figure 6:
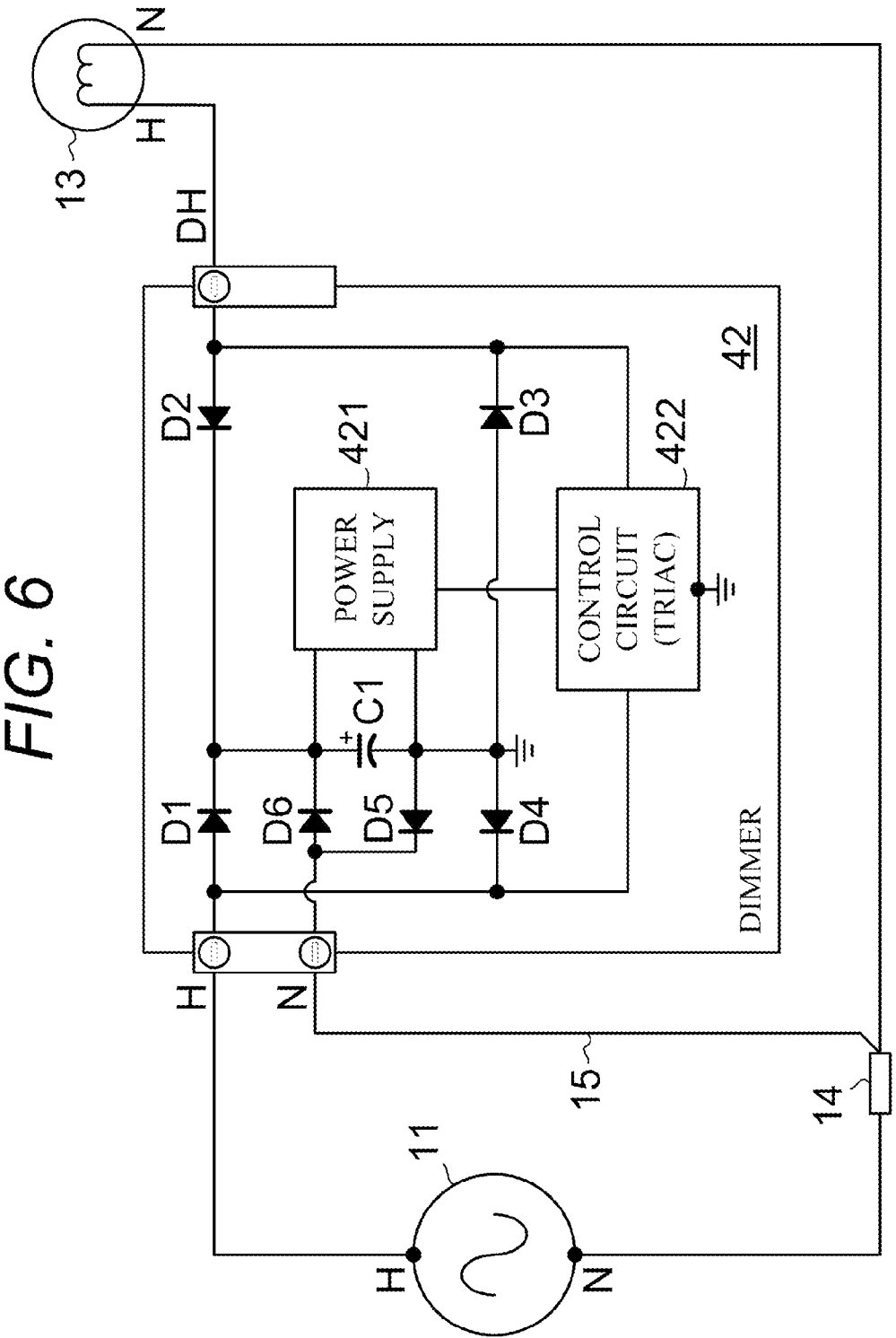

FIG. 6 further details the operation of my inventive dimmer while it is operating in a three-wire configuration in accordance with an illustrative embodiment of my invention.

Figure 7:
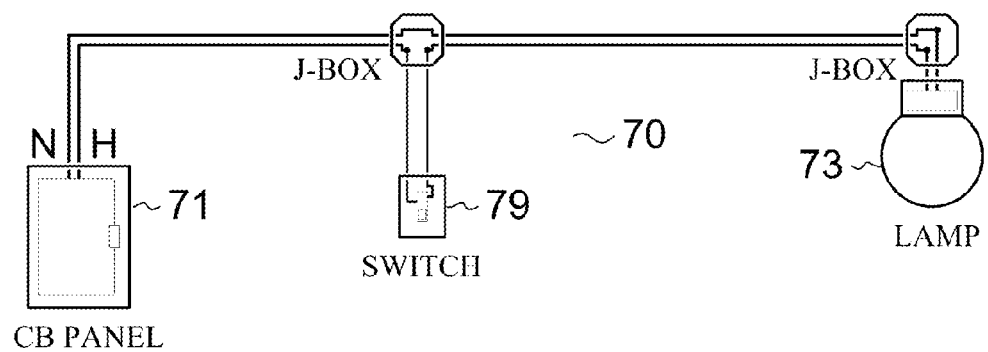

FIG. 7 shows a typical residential lighting circuit including a SPST switch.

Figure 8:
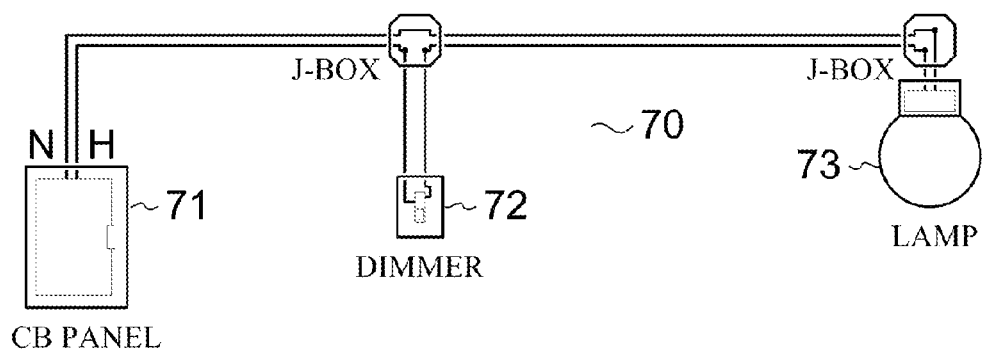

FIG. 8 shows the residential lighting circuit of FIG. 7 where the SPST switch has been replaced by my inventive dimmer connected in a two-wire configuration.

Figure 9:
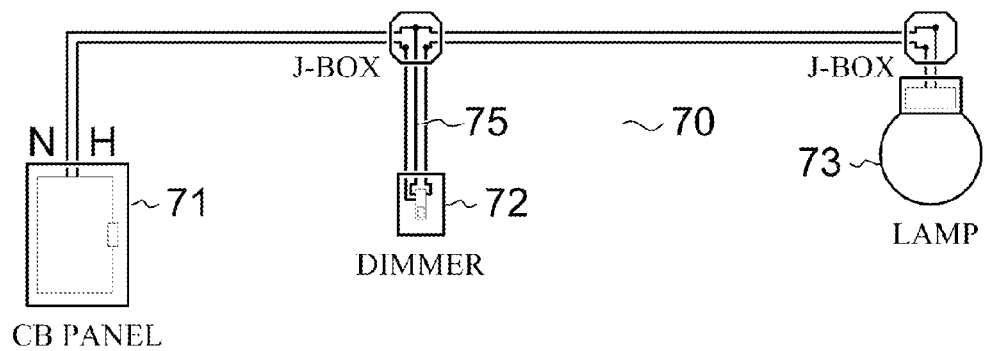

FIG. 9 shows the residential lighting circuit of FIG. 8 where my inventive dimmer has been adapted from a two-wire to a three-wire configuration.

Figure 10:
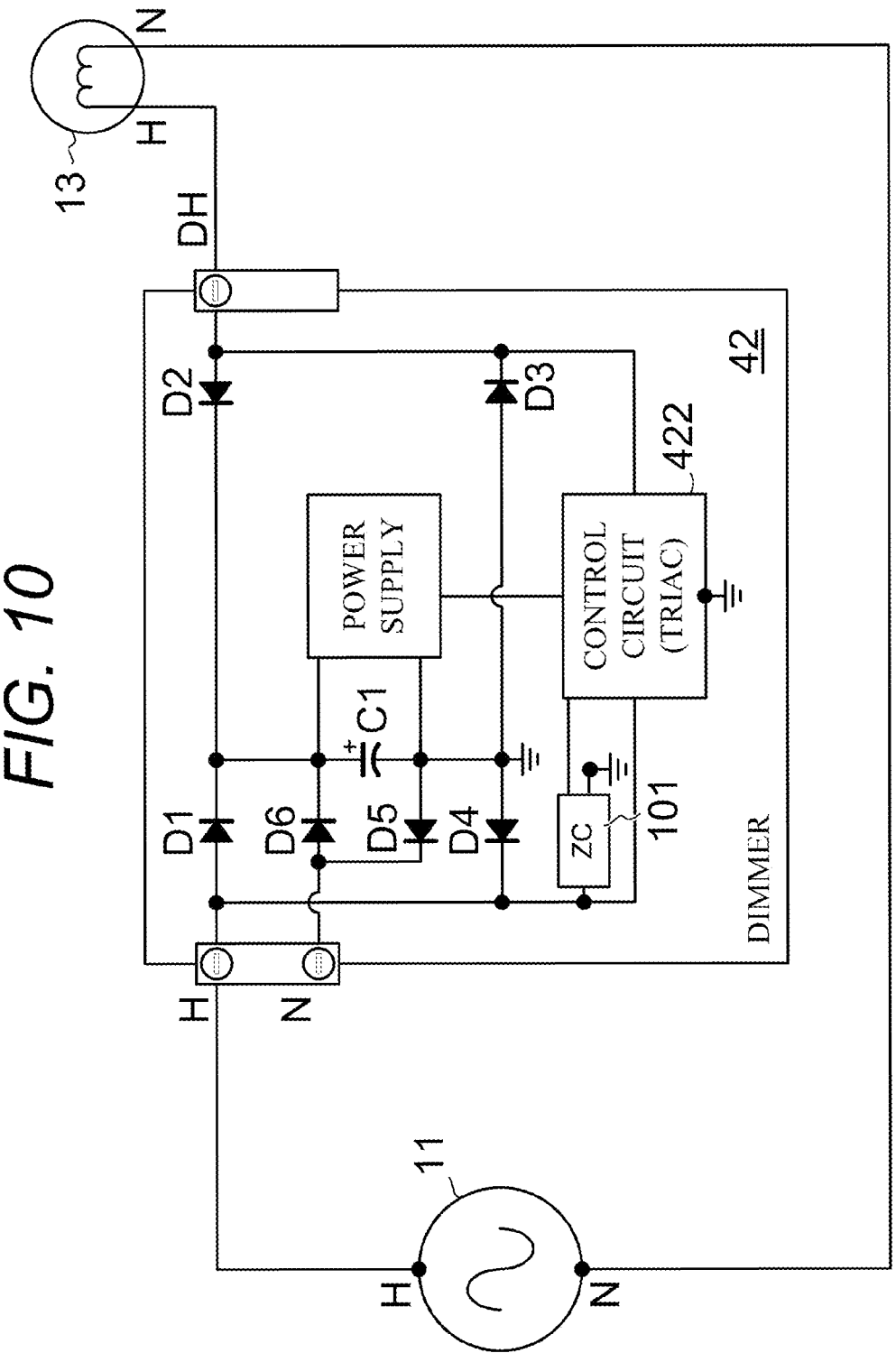

FIG. 10 further details the operation of my inventive dimmer while it is operating with two active wires in accordance with an illustrative embodiment of my invention.

Figure 11:
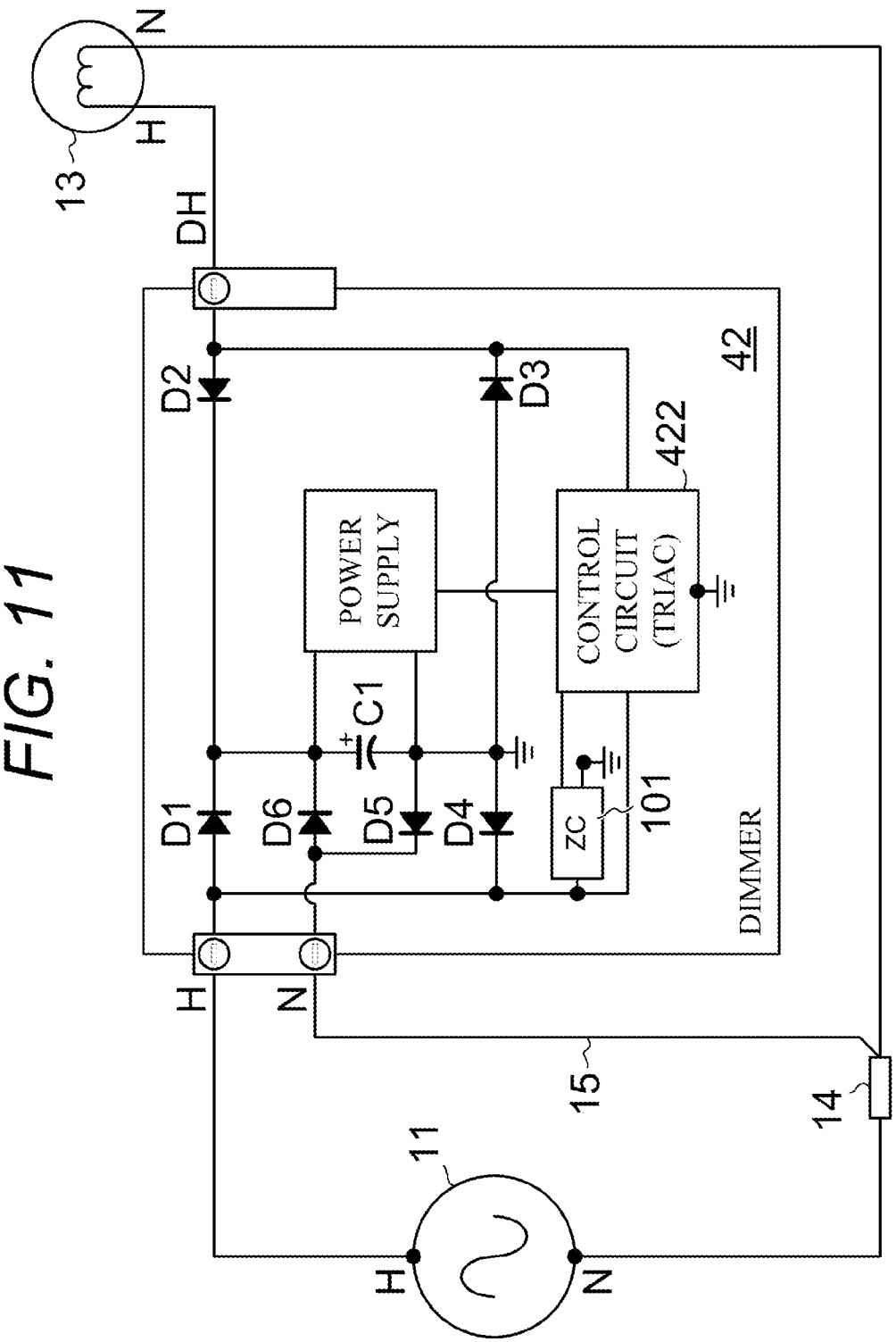

FIG. 11 further details the operation of my inventive dimmer while it is operating with three active wires in accordance with an illustrative embodiment of my invention.

FIG. 12 shows waveforms input to and output from a control circuit of the inventive dimmer detailed in FIG. 10 and FIG. 11, according to an embodiment of the invention.

Figure 13:
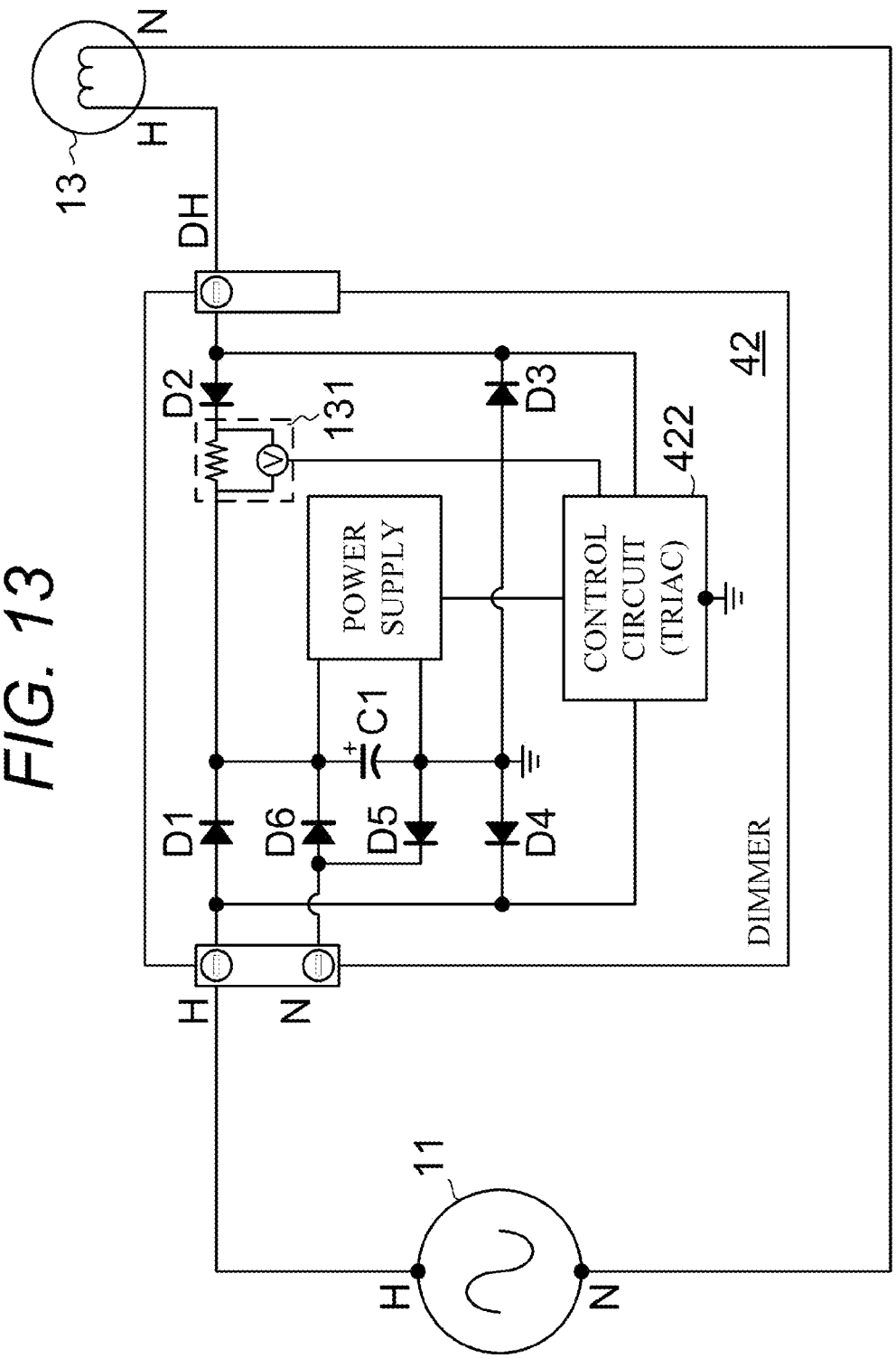

FIG. 13 further details the operation of my inventive dimmer while it is operating with two active wires in accordance with an illustrative embodiment of my invention.

Figure 14:
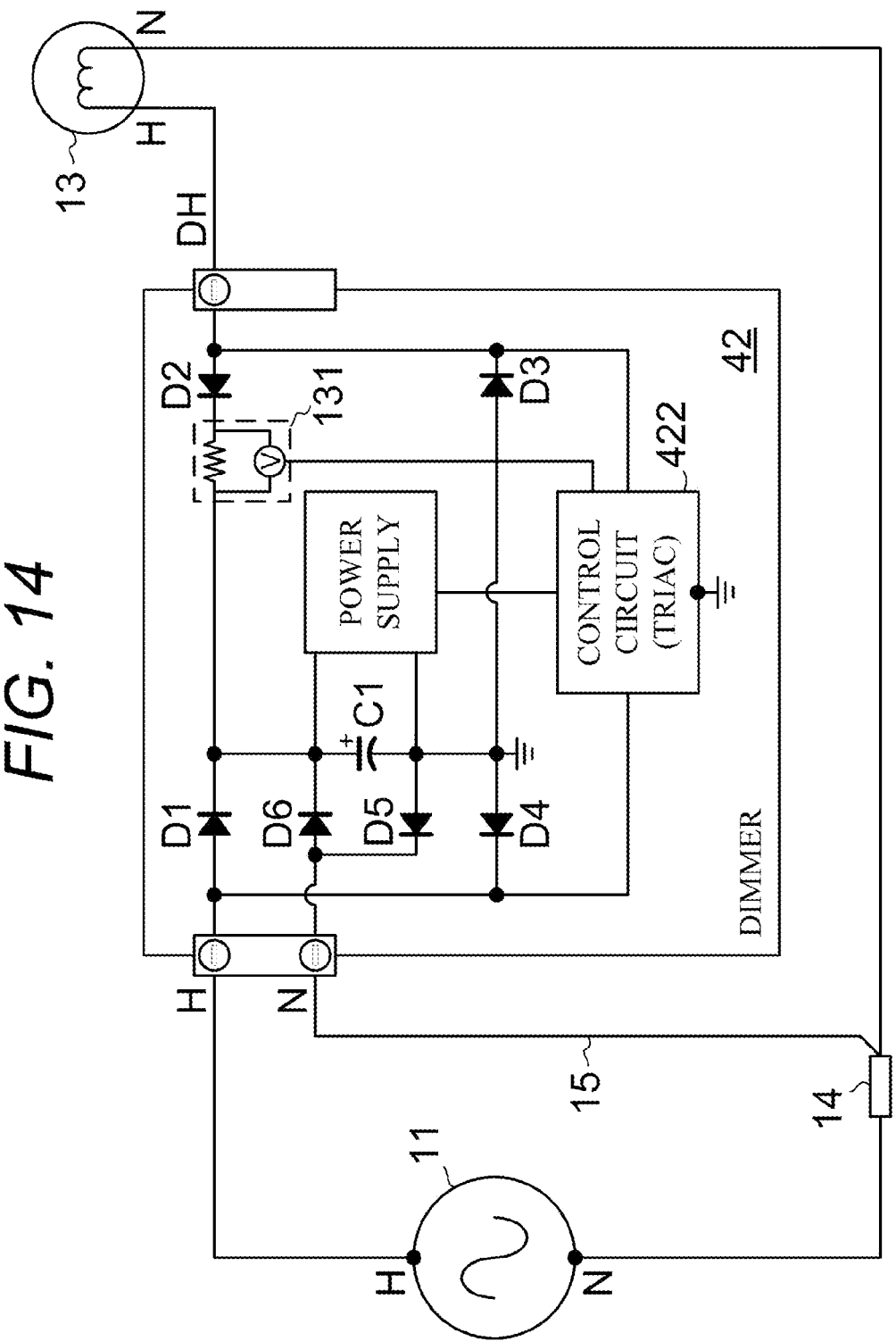

FIG. 14 further details the operation of my inventive dimmer while it is operating with three active wires in accordance with an illustrative embodiment of my invention.

Figure 15:
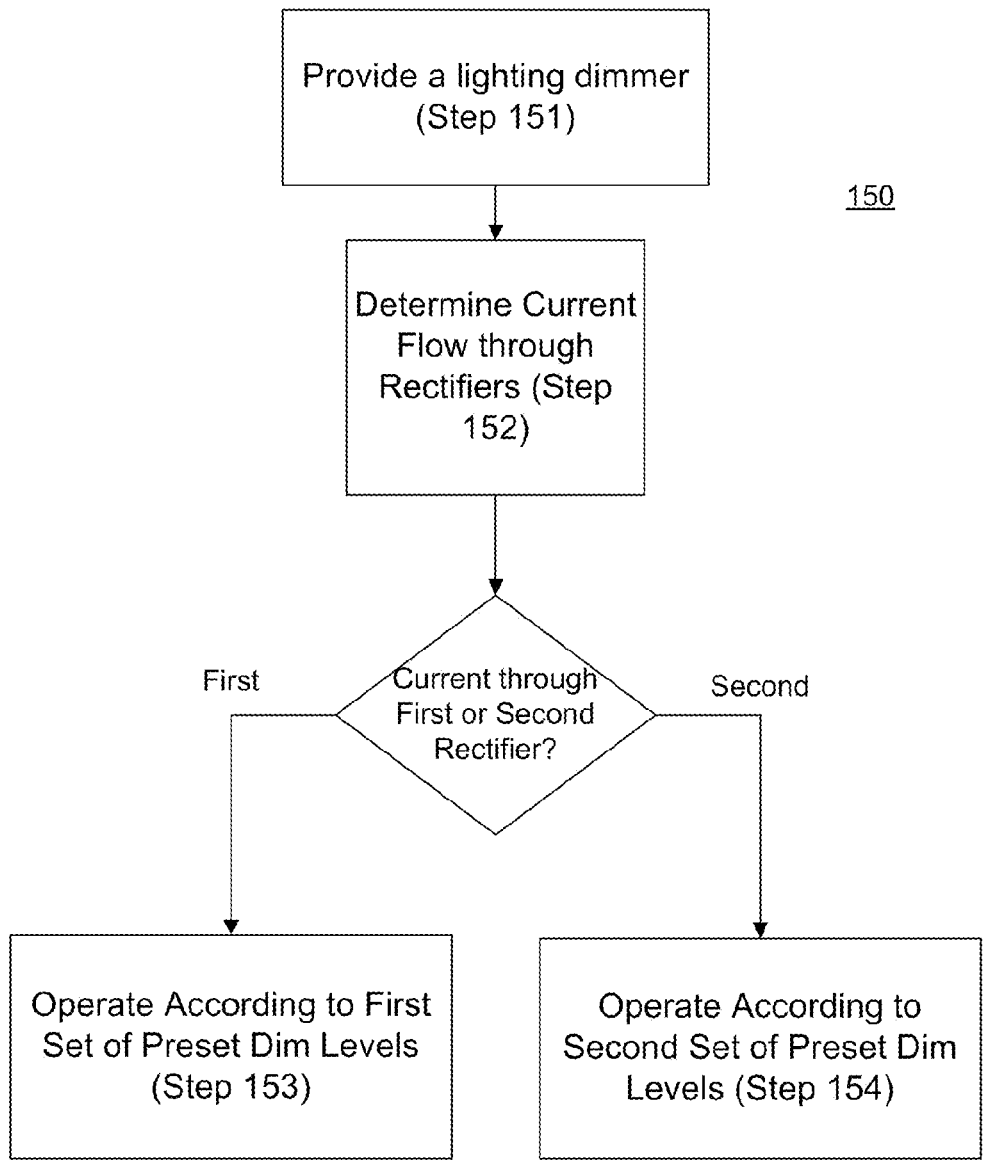

FIG. 15 is a flow chart illustrating a method according to an illustrative embodiment of the invention of operating a dimmer according to a first or second set of preset dim levels.

Figure 16:
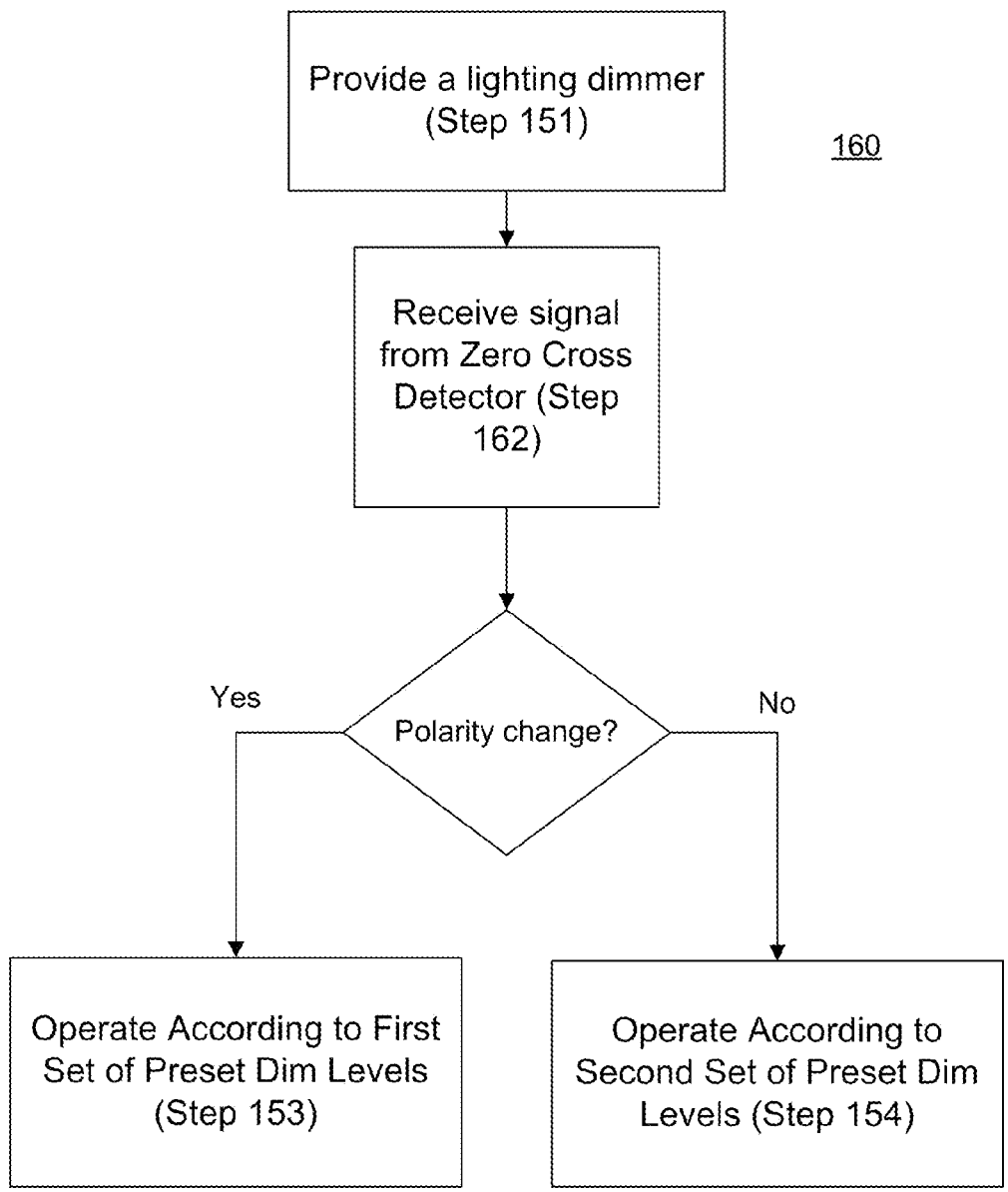

FIG. 16 is a flow chart illustrating additional steps for the method of operating a dimmer according to a first or second set of preset dim levels shown in FIG. 15.

Figure 17:
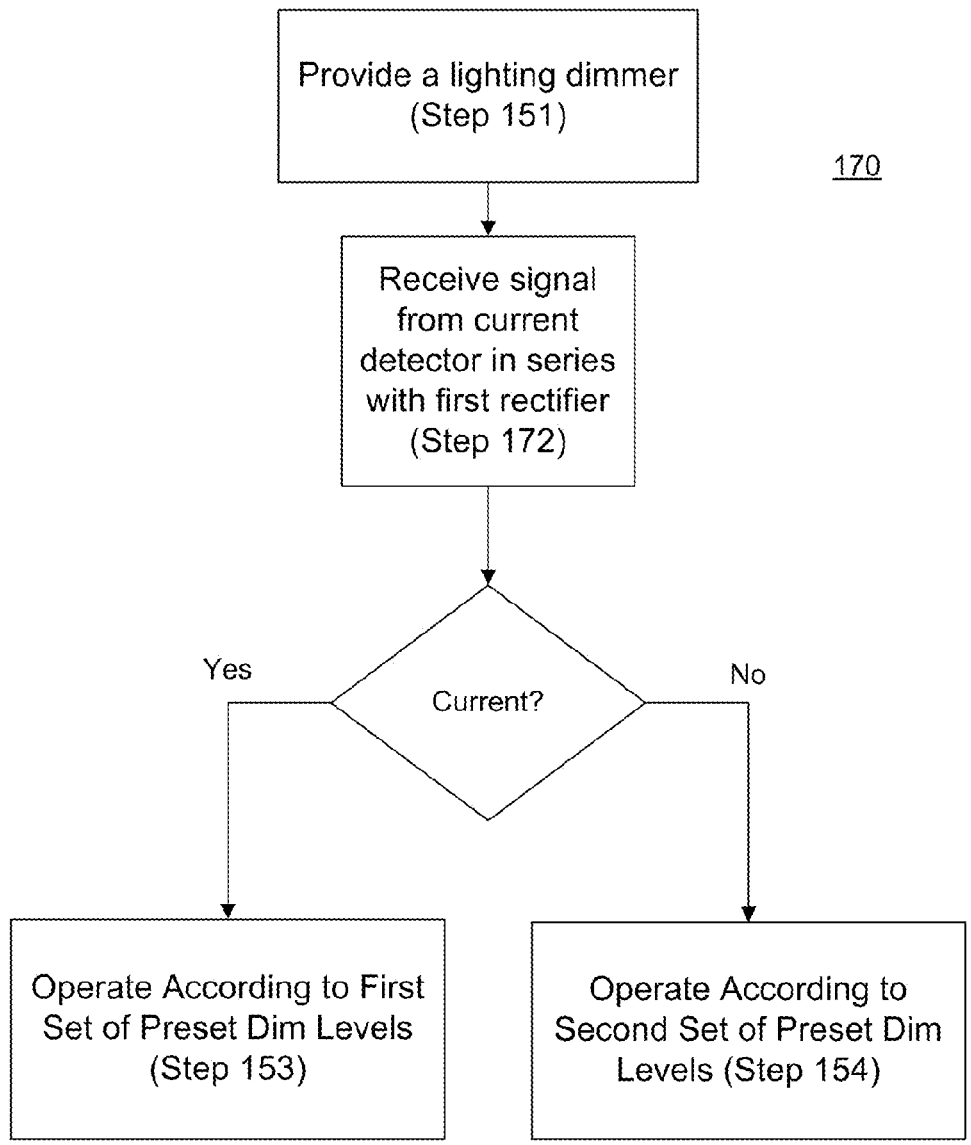

FIG. 17 is a flow chart illustrating additional steps for the method of operating a dimmer according to a first or second set of preset dim levels shown in FIG. 15.

LIST OF REFERENCE NUMBERS FOR THE MAJOR ELEMENTS IN THE DRAWING

The following is a list of the major elements in the drawings in numerical order.

11 AC power source
12 three-wire dimmer (prior art)
13 lighting load
14 splice (to residential lighting circuit neutral)
15 neutral wire (for three-wire dimmer) (also 75)
22 two-wire dimmer (prior art)
32 manually configurable dimmer (prior art)
34 external jumper (for manually configurable dimmer 32)
42 standard dimmer adaptable to two or three-wires (also 72)
70 residential lighting circuit
71 circuit breaker panel (p/o residential lighting circuit 70)
72 standard dimmer adaptable to two or three-wires (also 42)
73 lamp (p/o residential lighting circuit 70)
75 neutral wire (for three-wire dimmer) (also 15)
79 SPST switch (p/o residential lighting circuit 70)
101 zero cross detector
121 AC supplied to external load
122 input signal
123 triac fire point
124 checkpoint
125 falling zero cross
126 rising zero cross
131 current detector
150 first flowchart
151 (step of) providing dimmer
152 (step of) determining current flow through rectifiers
153 (step of) switchably providing a conductive path according to a first set of preset dim levels
154 (step of) switchably providing a conductive path according to a second set of preset dim levels
160 second flowchart
161 (step of) receiving input signal from zero cross detector
170 third flowchart
171 (step of) detecting current at first full-wave rectifier
421 power supply (internal to adaptable dimmer 42)
422 control circuit (internal to adaptable dimmer 42)
C1 storage capacitor (internal to adaptable dimmer 42)
D1-D6 diodes (internal to adaptable dimmer 42)

DETAILED DESCRIPTION OF THE INVENTION

The present invention is designed to allow residential electrical contractors to use a single type lighting dimmer for both two-wire and three-wire applications.

Mode(s) for Carrying out the Invention

As described previously, present practice provides for a manually configurable dimmer for which the installer either adds an external jumper wire for two-wire applications or deletes this jumper wire for three-wire applications. There is no provision for retaining the external jumper if it is not required and if the jumper is installed incorrectly, serious equipment damage may occur.

Now, refer to FIG. 4 which shows a standard dimmer 42, which is adaptable to either two or three active wires in accordance with the present invention. The standard dimmer 42 is operated in the two-wire configuration by connecting the AC source 11 hot (H) wire to the standard dimmer 42 hot (H) and the lighting load 13 hot (H) wire to the standard dimmer 42 dimmer hot (DH).

The standard dimmer 42 is operated in the three-wire configuration by connecting the AC source 11 hot (H) wire to the standard dimmer 42 hot (H), the lighting load 13 hot (H) wire to the standard dimmer 42 dimmer hot (DH), and a neutral wire 15, which is connected by a splice 14 to a residential lighting circuit, to the standard dimmer 42 neutral (N). Advantageously, this provides a method to convert a residential lighting circuit from two to three wire operation, such as in a future household renovation, by simply adding a neutral wire. Such method is described below.

In a preferred embodiment, the standard dimmer 42 hot (H), dimmer hot (DH), and neutral (N) connections are screw terminals that are configured in a manner similar to a standard wall light switch.

Refer now to FIG. 5, which illustrates my inventive dimmer 42 as it would be connected for two-wire operation (i.e. when AC line neutral is not connected to the dimmer). When the neutral (N) terminal is not connected, the standard dimmer 42 power supply 421 charges up in both AC half-cycles through the lighting load 13 while keeping net DC current draw to a minimum.

During the positive AC half-cycle, while the control circuit 422, such as a semiconductor switching device like a triac, is non-conducting, current flows from the AC source 11 line hot (H) into the standard dimmer 42 H terminal. The positive half-cycle current then flows through diode D1, power supply 421 storage capacitor C1, through diode D3, then out of the standard dimmer 42 DH terminal. The positive half-cycle current finally flows through the lighting load 13 and returns to AC source 11 line neutral (N). This illustrates, for one embodiment, the power supply 421 storage capacitor C1 charging path during the positive AC half-cycle when control circuit 422 triac is off.

During the negative AC half-cycle, while the control circuit 422, such as a semiconductor switching device like a triac, is non-conducting, current flows from the AC source 11 line neutral (N) through the lighting load 13 and into the standard dimmer 42 DH terminal. The negative half-cycle current then flows through diode D2, power supply 421 storage capacitor C1, through diode D4, then out of the standard dimmer 42 H terminal. The negative half-cycle current finally returns to AC source 11 line hot (H). This illustrates, for one embodiment, the power supply 421 storage capacitor C1 charging path during the negative AC half-cycle when control circuit 422 triac is off.

Refer now to FIG. 6, which illustrates my inventive dimmer 42 as it would be connected for three-wire operation (i.e. when AC line neutral is connected to the dimmer). When the neutral terminal is connected, the standard dimmer 42 power supply 421 storage capacitor C1 can charge through the line cycle and without passing current through the lighting load 13.

During the positive AC half-cycle, current flows from the AC source 11 line hot (H) into the standard dimmer 42 H terminal. The positive half-cycle current then flows through diode D1, power supply 421 storage capacitor C1, through diode D5, then out of the standard dimmer 42 N terminal. The positive half-cycle current finally returns to AC source 11 line neutral (N). Power Supply 421 capacitor C1 charging occurs whenever the voltage at standard dimmer 42 hot (H) to neutral (N) is greater that the voltage across capacitor C1 plus two forward diode drops (e.g. 1.4 volts for silicon diodes). Power Supply 421 capacitor C1 charging is not limited by the control circuit 422 switching device being off or by the lighting load 13 being connected to the overall residential lighting circuit.

During the negative AC half-cycle, current flows from the AC source 11 line neutral (N) into the standard dimmer 42 N terminal. The negative half-cycle current then flows through diode D6, power supply 421 storage capacitor C1, through diode D4, then out of the standard dimmer 42 H terminal. The negative half-cycle current finally returns to AC source 11 line hot (H). Power Supply 421 capacitor C1 charging occurs whenever the voltage at standard dimmer 42 neutral (N) to hot (H) is greater that the voltage across capacitor C1 plus two forward diode drops (e.g. 1.4 volts for silicon diodes). Power Supply 421 capacitor C1 charging is not limited by the control circuit 422 switching device being off or by the lighting load 13 being connected to the overall residential lighting circuit.

Continue to refer to FIGS. 5 and 6. In one embodiment, my inventive dimmer 42 includes an AC line hot (H) connection, an AC line neutral (N) connection, a dimmer hot (DH) connection, an internal power supply 421, a storage capacitor C1 associated with the power supply, a control circuit 422, and two-full-wave rectifiers. It is contemplated that in certain embodiments, the storage capacitor C1 may be substituted with another type of energy storage device, such as a battery.

The first full-wave rectifier, comprising diodes D1, D2, D3, and D4, rectifies an alternating current (AC) input voltage present between the standard dimmer 42 H and DH connections and provides a direct current output voltage across the energy storage device capacitor C1. The second full-wave rectifier, comprising diodes D1, D4, D5, and D6, rectifies an alternating current (AC) input voltage present between the standard dimmer 42 H and N connections and also provides a direct current output voltage across the energy storage device capacitor C1.

The direct current (DC) output voltage presented across capacitor C1 is both stored locally at capacitor C1 and used to drive power supply 421, which provides a local DC voltage, such as +5 VDC, which is used to power various circuitry within the standard dimmer 42, including the control circuit 422. It is contemplated that the standard dimmer 42 could include other circuitry such as display elements, network drivers, RF transmitters and receivers, and other logic and sensors.

One advantage of the present inventive dimmer is that it is simple to reconfigure in the field, such as by an electrical contractor. This simplicity is illustrated by the two methods of reconfiguring a residential lighting circuit which incorporates the inventive dimmer operative listed below.

Consider the home residential lighting circuit 70 depicted schematically in FIG. 7. A circuit breaker panel 71 is connected through a single pole single throw (SPST) switch 79 to a lamp 73. The AC circuit hot (H) is routed through switch 79 and the circuit neutral (N) is wired directly from the circuit breaker panel 71 to the lamp 73. As is known to those skilled in the art, the actual circuit connections are enclosed in protective junction boxes (J-Box).

Next, consider that the home owner wants to add dimming functionality to the lamp 73. Such a modification is depicted schematically in FIG. 8. Note that the AC circuit hot (H) is now routed through dimmer 72, which is preferably the standard dimmer of the present invention wired in a two-wire configuration, instead of SPST switch 79. Such a two-wire configuration entails making the appropriate connections to the standard dimmer 42 H and DH terminals as described previously for FIG. 4.

Finally, assume that the home owner wishes to improve the dimming functionality of lamp 73 by using three-wire dimming instead of two-wire dimmer functionality. Such a modification is depicted schematically in FIG. 9. Note that the only addition is a neutral wire 75 running from an electrical junction box to the inventive dimmer 72. If the homeowner had chosen a prior art dimmer, such as the manually configurable dimmer 32 shown in FIG. 3, there would be additional steps required to complete this modification such as configuring an external jumper 34 at the manually configurable dimmer 32. Advantageously, the present inventive dimmer 42 can be modified from two to three wire operation by the simple addition of a single neutral wire 75 to its N terminal, as shown in FIG. 4.

It will be obvious to those skilled in the art that the present inventive dimmer 42, as shown in FIG. 4 can also be configured back from a three-wire configuration, as shown in FIG. 9 to the two-wire configuration as shown in FIG. 8 by the step of removing neutral wire 75.

It is desirable to operate lighting dimmers according to preset dim levels as it provides user access to commonly used dim levels. It is known to provide buttons on lighting dimmers corresponding to a set of preset dim levels. For example, a lighting dimmer may include a preset button, actuatable by a user, which corresponds to a 50% dim level.

In an embodiment of the invention, the inventive dimmer 42 is operable according to a first set of preset dim levels or according to a second set of preset dim levels dependent on whether the lighting dimmer is connected to two active wires or three active wires as determined by current flowing through either the first full-wave rectifier (D1, D2, D3, D4) or second full-wave rectifier (D1, D4, D5, D6). In this embodiment, the control circuit 422 is configured to switchably provide a conductive or nonconductive path to the load according to the first set of predefined dim levels when current is flowing through the first full-wave rectifier (D1, D2, D3, D4) (i.e there are two active wires attached to the inventive dimmer). The control circuit switchably provides a conductive path according to the second set of predefined dim levels when current is flowing through the second full-wave rectifier (D1, D4, D5, D6).

Advantageously, by providing two operable sets of preset dim levels, the dimmer 42 may take advantage of the additional functionality of having AC line neutral connected to the dimmer. When AC line neutral is connected to the N terminal of the dimmer 42, the power supply is charged by a voltage across the H terminal and the N terminal and therefore the entire AC waveform is available to power the load. Accordingly, the second set of preset dim levels may comprise a preset dim level of full power (i.e. the load receives the full waveform). Contrastingly, the entire AC waveform is not available to power the load when the dimmer 42 is connected to only two active wires at the H terminal and the DH terminal. Accordingly, the first set of preset dim levels may comprise, for illustrative example, a maximum dim level of 90%.

FIG. 10 and FIG. 11 illustrate the inventive dimmer as it would be connected for two active wires and for three active wires, respectively, according to an embodiment of the invention. In this embodiment of the invention, the dimmer further comprises a zero cross detector 101 connected in series with the H terminal of the inventive dimmer 42 and bus common of the dimmer. The zero cross detector provides an input signal to the control circuit comprising both zero cross information and information used by the control circuit to determine whether current is flowing through the first full-wave rectifier (D1, D2, D3, D4) or second full-wave rectifier (D1, D4, D5, D6). to determine whether current is flowing through the first full-wave rectifier (D1, D2, D3, D4) or second full-wave rectifier (D1, D4, D5, D6). Accordingly, the control circuit operates according to the first set of preset dim levels or the second set of preset dim levels.

The control circuit determines whether current is flowing through the first or second full wave rectifier from the input signal provided from the zero cross detector 101. FIG. 12 shows the waveforms of the input signal from the zero cross detector 101 and of the AC provided to the external load 13 when the dimmer is in an OFF state 12a and when the dimmer is at 50% dim level and connected to two active wires 12b and connected to three active wires 12c.

When the dimmer is in an OFF state, i.e. no power to the load, the zero cross detector 101 provides a square wave input signal 122a to the control circuit with a substantially 50% duty cycle.

When the dimmer is operating and connected to two active wires, the zero cross detector provides a square wave input signal 122b to the control circuit 422 with a duty cycle dependent on the duty cycle of the AC supplied to the external load 121b. At the beginning of the positive half cycle of the AC supplied to the external load 121b, the square wave input signal 122b is at a logic low level. A change in the conductive path to the load (i.e. triac firing 123) causes the square wave input signal 122b to change from a logic low to a logic high in the positive half cycle when the lighting dimmer is connected to two active wires. The square wave input signal 122b stays at a high logic level until a rising zero cross 126 causes it to switch to logic low.

When the dimmer is operating and connected to three active wires, the zero cross detector provides a square wave input signal 122c to the control circuit 422 with a duty cycle of substantially 50% and which is not dependent on the duty cycle of the AC supplied to the external load 121c. At the beginning of the positive half cycle of the AC supplied to the external load 121c, the square wave input signal 122c is at a logic low level. A change in the conductive path to the load (i.e. triac firing 123) causes no change in the input signal from the zero cross detector when the lighting dimmer is connected to three active wires. The input signal 121c switches from logic low to logic high at the falling zero cross 125 and remains logic high until the rising zero cross 126.

The control circuit determines whether two or three active wires by detecting at a checkpoint 124 a logic high in the positive half cycle after a change from a nonconductive path to a conductive path (i.e. triac firing 123). If detected, the control circuit determines current is flowing through the first rectifier and the dimmer is connected to two active wires; accordingly, the control circuit operates according to a first set of preset dim levels. If not detected at the checkpoint 124, the control circuit determines current is flowing through the second rectifier and the dimmer is connected to three active wires; accordingly, the control circuit operates according to the second set of preset dim levels.

FIG. 13 illustrates the inventive dimmer 42 as it would be connected for two active wires, according to an embodiment of the invention. The inventive dimmer 42 further comprises a current detector 131, such as a shunt resistor ammeter, connected in series between an output of the diode D2 and the control circuit 422. Although this embodiment comprises a shunt resistor ammeter for detecting current, it has been contemplated to use other known methods for sensing current, including but not limited to a hall effect sensor transducer, a transformer, and a magentoresistive field sensor. The current sensor is configured to detect whether current is flowing through the diode D2 and provide an input signal to the control circuit 422. The control circuit 422 determines whether current is flowing through the first full-wave rectifier (D1, D2, D3, D4) or the second full-wave rectifier (D1, D4, D5, D6) depending on the input received from the current detector 131.

When the inventive dimmer 42 is operating with two active wires, as in FIG. 11, during the negative half cycle, current will flow from AC line neutral (N), through the load and into the DH terminal. During the portion of the negative half cycle when the control circuit 422 is non-conducting, current will then flow through diode D2, current detector 131, power supply storage capacitor C1, through diode D4 and then out of the hot terminal to AC line hot (H). The current detector 131 will detect the voltage drop across a shunt resistor of the current detector 131 and provide an input signal to the control circuit 422 corresponding to a current flow through diode D2.

When the inventive dimmer 42 is operating with three active wires, as in FIG. 14, current will not flow through the diode D2 during the positive half cycle or the negative half cycle. Accordingly, the current detector 131 will not detect a voltage drop across the shunt resistor of the current detector 131 and provide an input signal to the control circuit 422 corresponding to no current flow through diode D2.

FIG. 12 is a flow chart illustrating a method according to an illustrative embodiment of the invention of operating a dimmer according to a first or second set of preset dim levels. In step 151, a dimmer is provided comprising a first full-wave rectifier (D1, D2, D3, D4), a second full-wave rectifier (D1, D4, D5, D6) and a control circuit 422. The control circuit is switchably operable to provide either a conductive or a non-conductive electrical path between an AC line hot connection and a dimmer hot connection of the lighting dimmer. The first full-wave rectifier is configured for rectifying an alternating current input voltage present between the AC line hot connection and the dimmer hot connection, wherein the alternating current input voltage between the AC line hot connection and dimmer hot connection is present when the control circuit is providing a nonconductive electrical path between the AC line hot connection and the dimmer hot connection and an external load is connected between the dimmer hot connection and an AC line neutral return. The second full-wave rectifier is configured for rectifying an alternating current input voltage present between the AC line hot connection and an AC line neutral connection, wherein the alternating current input voltage between the AC line hot connection and the AC line neutral connection is present only when the dimmer is connected to three active wires.

In step 152, the control circuit determines whether current is flowing through the first full-wave rectifier or the second full-wave rectifier. In step 153, the control circuit 422 switchably provides a conductive or nonconductive electrical path between the AC line hot connection and the dimmer hot connection according to a first set of preset dim levels when current is flowing through the first full-wave rectifier (D1, D2, D3, D4). In step 154, the control circuit 422 switchably provides a conductive or nonconductive electrical path between the AC line hot connection and the dimmer hot connection according to a second set of preset dim levels when current is flowing through the second full-wave rectifier (D1, D4, D5, D6).

FIG. 16 is a flow chart illustrating additional steps for the method of operating a dimmer according to a first or second set of preset dim levels shown in FIG. 15. More specifically, in an embodiment of the invention the control circuit receives an input signal from a zero cross detector to determine whether current is flowing through the first full-wave rectifier. In an embodiment of the invention, the input signal is a square wave and a polarity reversal after a triac fires in one of the half cycles indicates current flow through the first full-wave rectifier.

FIG. 16 is a flow chart illustrating additional steps for the method of operating a dimmer according to a first or second set of preset dim levels shown in FIG. 15. More specifically, in an embodiment of the invention the control circuit receives an input signal from a current detector to determine whether current is flowing through the first full-wave rectifier. In an embodiment of the invention, the current detector is connected in series with the first full-wave rectifier. Current detection indicates current flow through the first full-wave rectifier.

List of Acronyms Used in the Detailed Description of the Invention

The following is a list of the acronyms used in the specification in alphabetical order.
DH dimmer hot (variable voltage)
G ground (safety ground)
H hot conductor (120 VAC)
N neutral conductor (120 VAC return)
rms root-mean-squared (AC voltage measurement)
SPST single pole single throw (switch)
VAC volts, alternating current Alternate Embodiments Alternate embodiments may be devised without departing from the spirit or the scope of the invention.

For example, one alternate embodiment comprises a variable dimmer knob and a switch where the knob establishes a preset dim level and the switch controls the power ON/OFF. The power switch functions differently in the two-wire versus three-wire operational configurations.

What is claimed is:

1. A lighting dimmer adaptable to either two or three active wires, said dimmer comprising:
    (a) an AC line hot connection;
    (b) an AC line neutral connection;
    (c) a dimmer hot connection;
    (d) an internal power supply;
    (e) an energy storage device associated with, and providing power to, said power supply;
    (f) a control circuit powered by said power supply wherein said control circuit is switchably operable to provide either a conductive or a nonconductive electrical path between the AC line hot connection and the dimmer hot connection;
    (g) a first full-wave rectifier configured for rectifying an alternating current input voltage present between the AC line hot connection and the dimmer hot connection and to provide a direct current output voltage across the energy storage device, wherein said alternating current input voltage between the AC line hot connection and the dimmer hot connection is present when
        (i) the control circuit is providing a nonconductive electrical path between the AC line hot connection and the dimmer hot connection and
        (ii) an external load is connected between the dimmer hot connection and an AC line neutral return
    (h) a second full-wave rectifier configured for rectifying an alternating current input voltage present between the AC line hot connection and the AC line neutral connection and to provide a direct current output voltage across the energy storage device, wherein said alternating current input voltage between the AC line hot connection and the AC line neutral connection is present only when the dimmer is connected to three active wires; and
    (i) wherein said control circuit switchably operates to provide either a conductive or a nonconductive electrical path between the AC line hot connection and the dimmer hot connection
        (i) according to a first set of preset dimming levels when current is flowing through the first full-wave rectifier, and
        (ii) according to a second set of preset dimming levels when current is flowing through the second full-wave rectifier.

2. The lighting dimmer of claim 1 further comprising a zero cross detector between the AC line hot connection and bus common of the lighting dimmer, wherein the zero cross detector provides an input signal to the control circuit, said input signal comprising zero cross information and information indicating whether current is flowing through the first or second full-wave rectifier.

3. The lighting dimmer of claim 2 wherein the input signal varies in duty cycle according to the duty cycle of AC supplied to the external load when current is flowing through the first full-wave rectifier.

4. The lighting dimmer of claim 2 wherein the input signal is a square wave and a polarity reversal of the signal after the control circuit switches from providing a non-conductive electrical path to a conductive electrical path in one of the half cycles of the alternating current input voltage indicates a current flow through the first full-wave rectifier.

5. The lighting dimmer of claim 2 wherein the input signal is a square wave and wherein a logic high in the positive half cycle of the alternating current input voltage indicates a current flow through the first full-wave rectifier.

6. The lighting dimmer of claim 1 further comprising a current detector in series with either the first or second full-wave rectifier and providing an input signal to the control circuit.

7. The lighting dimmer of claim 6 further comprising a current detector in series with the first full-wave rectifier and providing an input signal to the control circuit.

8. The lighting dimmer of claim 7 wherein the current detector is a shunt resistor ammeter connected in series with the first full-wave rectifier.

9. The lighting dimmer of claim 1 wherein the control circuit comprises a triac and the first and second set of preset dimming levels each correspond to a set of firing angles of the triac.

10. The lighting dimmer of claim 1 wherein the second set of preset dimming levels comprises a dimming level corresponding to full power.

11. A method for operating a lighting dimmer according to either a first set of preset dimming levels or a second set of preset dimming levels, said method comprising the steps of:
  (a) providing the lighting dimmer, said lighting dimmer comprising
    (i) a control circuit switchably operable to provide either a conductive or a nonconductive electrical path between an AC line hot connection and a dimmer hot connection of the lighting dimmer
    (ii) a first full-wave rectifier configured for rectifying an alternating current input voltage present between the AC line hot connection and the dimmer hot connection, wherein said alternating current input voltage between the AC line hot connection and dimmer hot connection is present when the control circuit is providing a nonconductive electrical path between the AC line hot connection and the dimmer hot connection and an external load is connected between the dimmer hot connection and an AC line neutral return, and
    (ii) a second full-wave rectifier configured for rectifying an alternating current input voltage present between the AC line hot connection and an AC line neutral connection wherein said alternating current input voltage between the AC line hot connection and the AC line neutral connection is present only when the dimmer is connected to three active wires;
  (b) switchably providing a conductive or nonconductive electrical path between the AC line hot connection and the dimmer hot connection according to a first set of preset dimming levels when current is flowing through the first full-wave rectifier; and
  (c) switchably providing a conductive or nonconductive electrical path between the AC line hot connection and the dimmer hot connection according to a second set of preset dimming levels when current is flowing through the second full-wave rectifier.

12. The method of claim 11 further comprising the step of determining whether current is flowing through either the first of second full-wave rectifier.

13. The method of claim 12 wherein the step of determining whether current is flowing through the first or second full-wave rectifier further comprises the step of receiving at the control circuit an input signal from a zero cross detector between the AC line hot connection and common ground, said signal comprising information regarding current flow in the lighting dimmer.

14. The method of claim 13 wherein the input signal is a square wave and further comprising the step of recognizing a logic high in the positive half cycle of the input signal to indicate current flow in the first full-wave rectifier.

15. The method of claim 12 wherein the step of determining whether current is flowing through either a first or a second full-wave rectifier further comprises the step of receiving at the control circuit a signal from a current detector in series with either the first or second full-wave rectifier.

16. The method of claim 15 wherein the current detector is in series with first full-wave rectifier.

* * * * *